United States Patent [19]

Mu-Teng

[11] Patent Number: 5,938,738
[45] Date of Patent: Aug. 17, 1999

[54] PERIPHERAL CONTROL SYSTEM

[75] Inventor: Chung Mu-Teng, Miao Li Hsien, Taiwan

[73] Assignee: Mustek Systems Inc., Hsin-chu, Taiwan

[21] Appl. No.: 08/963,312

[22] Filed: Nov. 3, 1997

[51] Int. Cl.⁶ .................................................. G06F 13/00
[52] U.S. Cl. ............................ 709/301; 710/62; 710/41; 710/72
[58] Field of Search ................................... 709/300–303; 710/1–14, 36–48

[56] References Cited

U.S. PATENT DOCUMENTS

| | | | |
|---|---|---|---|
| 5,548,759 | 8/1996 | Lipe ......................................... | 395/611 |
| 5,633,472 | 5/1997 | DeWitt et al. ............................. | 84/602 |
| 5,640,885 | 6/1997 | Spence .................................... | 74/501.6 |
| 5,652,913 | 7/1997 | Crick et al. .............................. | 395/856 |
| 5,706,457 | 1/1998 | Dwyer et al. ........................... | 345/349 |
| 5,764,866 | 6/1998 | Maniwa .................................. | 395/114 |
| 5,809,303 | 9/1998 | Senator .................................... | 395/681 |
| 5,839,905 | 11/1998 | Redford et al. ......................... | 434/307 |
| 5,867,730 | 2/1999 | Leyda ...................................... | 395/830 |

*Primary Examiner*—Christopher B. Shin
*Attorney, Agent, or Firm*—Winston Hsu

[57] ABSTRACT

The present invention relates to a peripheral control system for controlling at least one peripheral device. The peripheral control system comprises a first computer electrically connected to a peripheral device comprising a memory for storing programs and data, and a processor for executing the programs stored in the memory; at least one peripheral driver program stored in the memory in an executable file format for driving the peripheral device. The peripheral driver program comprises a DDE (Dynamic Data Exchange) module; a peripheral management module (TWAIN) stored in the memory in a subroutine file format for managing the peripheral driver program, the peripheral management module comprising another DDE module for communicating with the DDE module of the peripheral driver program in standard DDE protocol; and at least an application program stored in the memory in an executable file format. The application program uses subroutine calls to communicate with the peripheral management module, and the peripheral management module uses its DDE module to communicate with the DDE module of the peripheral driver program so that the peripheral driver program controls the peripheral device according to instructions generated by the application program and passes data generated by the peripheral device to the application program.

3 Claims, 5 Drawing Sheets

PERIPHERAL CONTROL SYSTEM

BACKGROUND OF THE INVENTION

1. Field of the Invention

The present invention relates to a peripheral control system, and more particularly, to a peripheral control system having a peripheral driver program and an application program communicating with each other through DDE (dynamic data exchange) protocol.

2. Description of the Prior Art

Please refer to FIG. 1 and FIG. 2. FIG. 1 is a perspective view of a prior art peripheral control system 10. FIG. 2 is a function block diagram of the computer 12 shown in FIG. 1. The peripheral control system 10 is used for controlling a peripheral device 14, such as scanner or digital camera. The system 10 comprises a computer 12 connected to the peripheral device 14. The computer 12 comprises a memory 20 for storing programs and data, and a processor 22 for executing programs stored in the memory 20. The memory 20 comprises a peripheral driver module 24, a peripheral management module (TWAIN) 26, and an application program 28. The peripheral driver module 24 is stored in a subroutine file format, such as the DLL file in Windows 95 from Microsoft Corporation, for driving the peripheral device 14. The peripheral management module 26 is also stored in a subroutine file format which uses subroutine calls to communicate with the peripheral driver module 24. The application program 28 is stored in an executable file format, such as the EXE file, which uses subroutine calls to communicate with the peripheral management module 26.

The peripheral management module (TWAIN) 26 is a standard subroutine library developed by many image peripheral vendors and application program vendors for managing data communications between application programs provided by application program vendors and peripheral driver modules provided by image peripheral vendors. The image peripherals include scanners, digital cameras, image database, etc.. And the application programs include image processing software, fax processing software, word processors, etc..

Please refer to FIG. 3. FIG. 3 is a diagrammatic view of the control flow between the application program 28 and the peripheral driver module 24 shown in FIG. 2. The application program 28 uses subroutine calls to communicate with the peripheral management module 26, and then the peripheral management module 26 uses subroutine calls to communicate with the peripheral driver module 24. The peripheral driver module 24 controls the peripheral device 14 according to instructions generated by the application program 28 and passes data between the application program 28 and the peripheral device 14.

One disadvantage of the prior art peripheral control system 10 is that both the peripheral management module 26 and the peripheral driver module 24 are in a subroutine file format instead of in executable file format. Only the application program 28 is in executable file format and can be executed independently. The peripheral management module 26 and the peripheral driver module 24 are initiated by the application program 28 before making subroutine calls and thus share the same allocated resources such as memory space. In such situation the peripheral driver module 24 must be executed together with the application program 28 in a computer. If any of them gets failed, both of them will stop execution. Besides, since the peripheral driver module 24 must be passively initiated by the application program 28, it is impossible to add any automatically executable functions into the peripheral driver module 24 such as the automatic detecting and scanning function provided by many scanners nowadays. Such functions must be provided by using other software and/or hardware because of the passive initiation restriction of the peripheral driver module 24.

SUMMARY OF THE INVENTION

It is therefore a primary objective of the present invention to provide a peripheral control system which provides a peripheral driver program in an executable file format so that it can be independently executed and communicate with other local executable programs or remote executable programs through a network.

Briefly, in a preferred embodiment, the present invention includes a peripheral control system for controlling at least one peripheral device comprising:

a first computer electrically connected to the peripheral device comprising a memory for storing programs and data, and a processor for executing the programs stored in the memory;

at least one peripheral driver program stored in the memory in an executable file format for driving the peripheral device, the peripheral driver program comprising a DDE (Dynamic Data Exchange) module;

a peripheral management module (TWAIN) stored in the memory in a subroutine file format for managing the peripheral driver program, the peripheral management module comprising another DDE module for communicating with the DDE module of the peripheral driver program in standard DDE protocol; and at least an application program stored in the memory in an executable file format;

wherein the application program uses subroutine calls to communicate with the peripheral management module, and the peripheral management module uses its DDE module to communicate with the DDE module of the peripheral driver program whereby the peripheral driver program controls the peripheral device according to instructions generated by the application program and passes data between the peripheral device and the application program. The peripheral control system further comprises a second computer electrically connected to the first computer through a network. The second computer comprises:

a second memory for storing programs and data;

a second processor for executing the programs stored in the second memory;

a second peripheral management module stored in the second memory in a subroutine file format for managing the peripheral driver program of the first computer, the second peripheral management module comprising a second DDE module for communicating with the DDE module of the peripheral driver program of the first computer in standard network DDE protocol; and at least one second application program stored in the second memory in an executable file format; wherein the second application program uses subroutine calls to communicate with the second peripheral management module, and the peripheral management module uses its DDE module to communicate with the DDE module of the peripheral driver program whereby the peripheral driver program of the first computer controls the peripheral device according to instructions generated by the second application program and passes data between the peripheral device and the second application program.

It is an advantage of the present invention that the peripheral driver program of the peripheral control system is in an executable file format which can be executed independently. The peripheral driver program comprises a DDE (Dynamic Data Exchange) module and the peripheral management module also comprises a DDE module for communicating with the DDE module of the peripheral driver program in standard DDE protocol. The peripheral driver program can be executed independently and communicate with the application program coupled with the peripheral management module or other local or remote executable programs in standard DDE protocol.

This and other objectives of the present invention will no doubt become obvious to those of ordinary skill in the art after having read the following detailed description of the preferred embodiment which is illustrated in the various drawings and figures.

DETAILED DESCRIPTION OF THE PREFERRED EMBODIMENT

Figure 4:
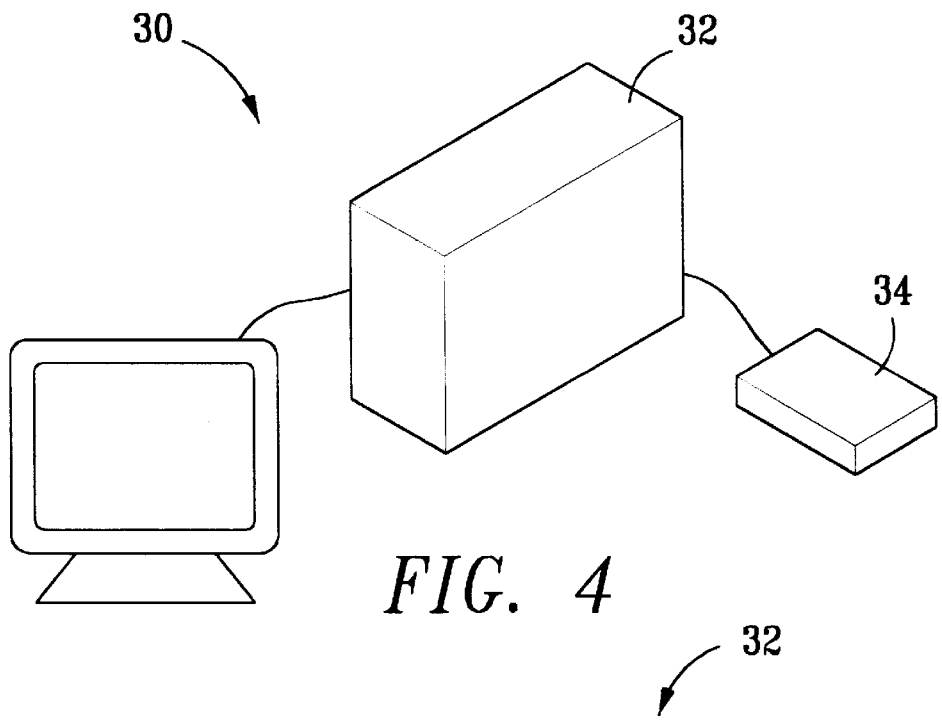
FIG. 4 is a perspective view of a peripheral control system according to the present invention.
Figure 5:
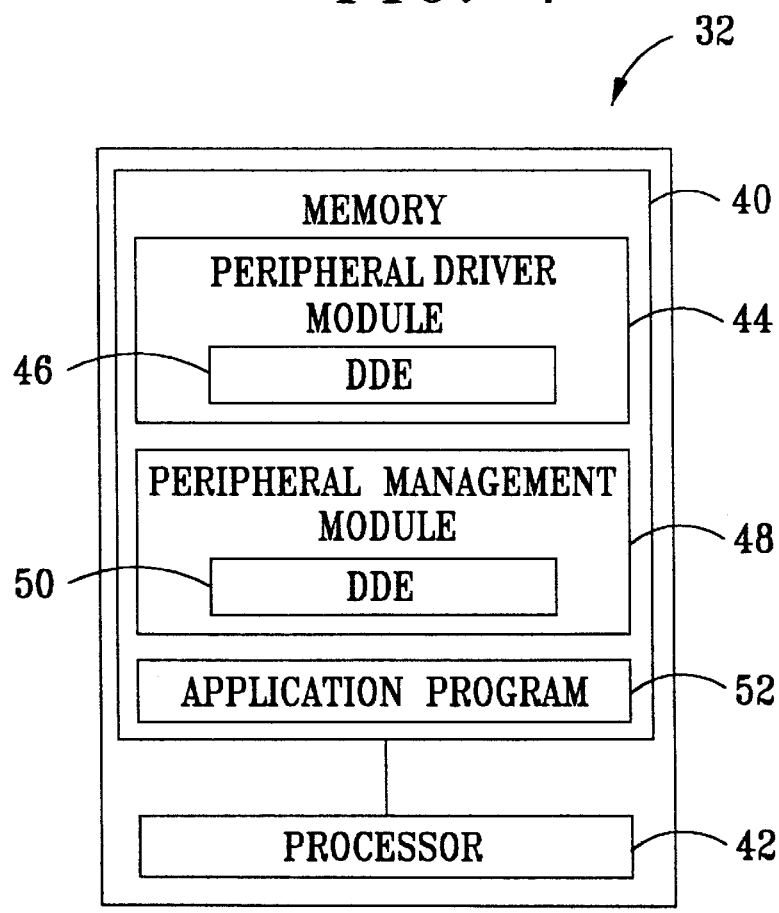
FIG. 5 is a function block diagram of the computer shown in FIG. 4.

Please refer to FIG. 4 and FIG. 5. FIG. 4 is a perspective view of a peripheral control system 30 according to the present invention. FIG. 5 is a function block diagram of the computer 32 shown in FIG. 4. The peripheral control system 30 is used for controlling a peripheral device 34. The peripheral control system 30 comprises a computer 32 connected to the peripheral device 34. The computer 32 comprises a memory 40 for storing programs and data, and a processor 42 for executing programs stored in the memory 40. The memory 40 comprises a peripheral driver program 44, a peripheral management module 48, and an application program 52 stored in it. The peripheral driver program 44 is used for driving the peripheral device 34. It comprises a DDE (dynamic data exchange) module 46 and is stored in an executable file format, such as the EXE file in Windows 95 from Microsoft Corporation. The peripheral management module 48 is used for managing the peripheral driver program 44. It is stored in a subroutine file format such as the DLL file. It also comprises a DDE module 50 for communicating with the DDE module 46 of the peripheral driver program 44 in standard DDE protocol. The application program 52 is stored in an executable file format, such as the EXE file. It uses subroutine calls to communicate with the peripheral management module 48.

Figure 1:
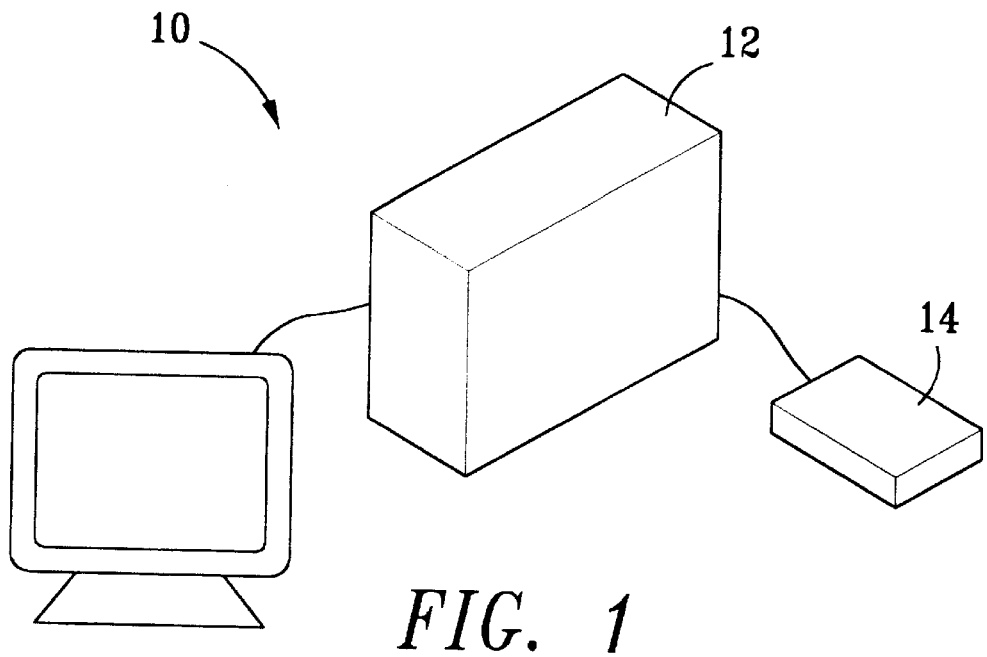
FIG. 1 is a perspective view of a prior art peripheral control system.
Figure 2:
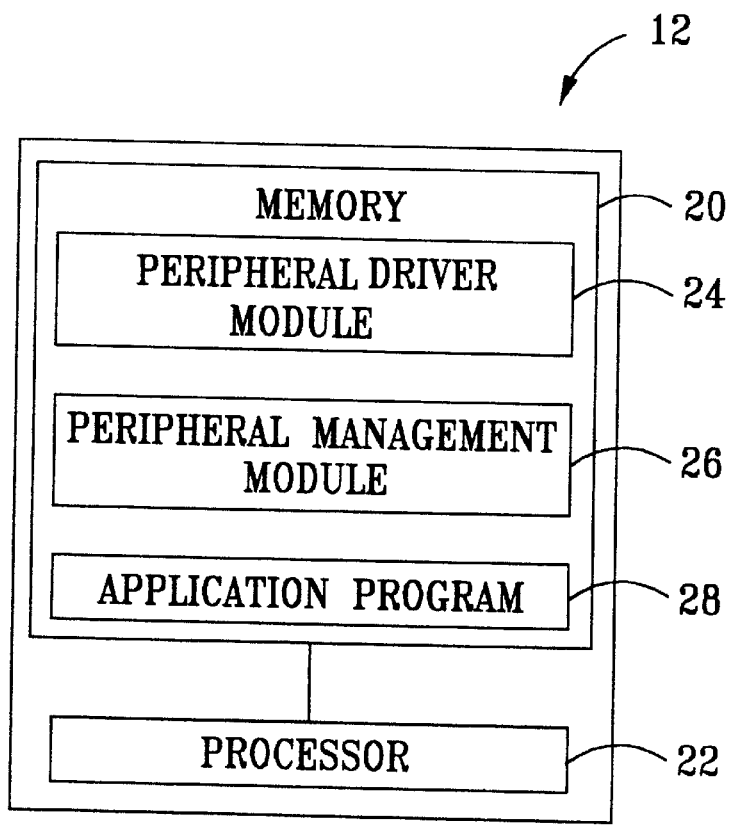
FIG. 2 is a function block diagram of the computer shown in FIG. 1.
Figure 3:
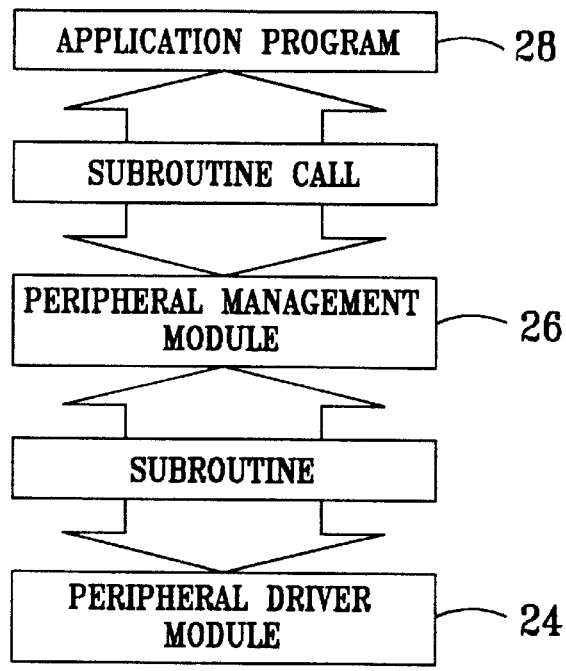
FIG. 3 is a diagrammatic view of the control flow between the application program and the peripheral driver module shown in FIG. 2.
Figure 6:
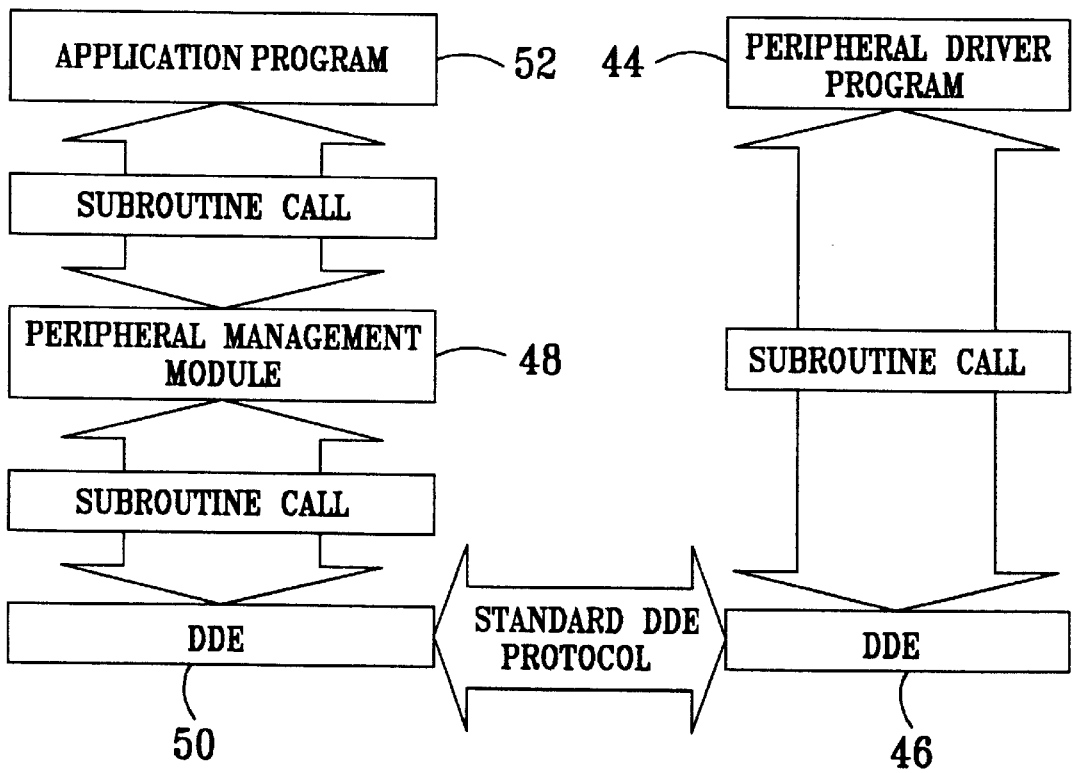
FIG. 6 is a diagrammatic view of the control flow between the application program and the peripheral driver program shown in FIG. 5.

Please refer to FIG. 6. FIG. 6 is a diagrammatic view of the control flow between the application program 52 and the peripheral driver program 44 shown in FIG. 5. The application program 52 uses subroutine calls to communicate with the peripheral management module 48, and then the peripheral management module 48 uses subroutine calls to communicate with its DDE module 50. The DDE module 50 of the peripheral management module 48 communicates with the DDE module 46 of the peripheral driver program 44 in standard DDE protocol. The peripheral driver program 44 controls the peripheral device 34 according to instructions generated by the application program 52 and passes data between the peripheral device 34 and the application program 52. The peripheral driver program 44 can be initiated in at least two different ways: the peripheral management module 48 can initiate the peripheral driver program 44 before passing instructions or data to it, or the peripheral driver program 44 can be initiated by the computer 32 automatically when the computer 32 is turned on. When the application program 52 is terminated by a user, the peripheral driver program 44 can keep on execution so that other application programs can communicate with it or it can be terminated immediately.

Figure 7:
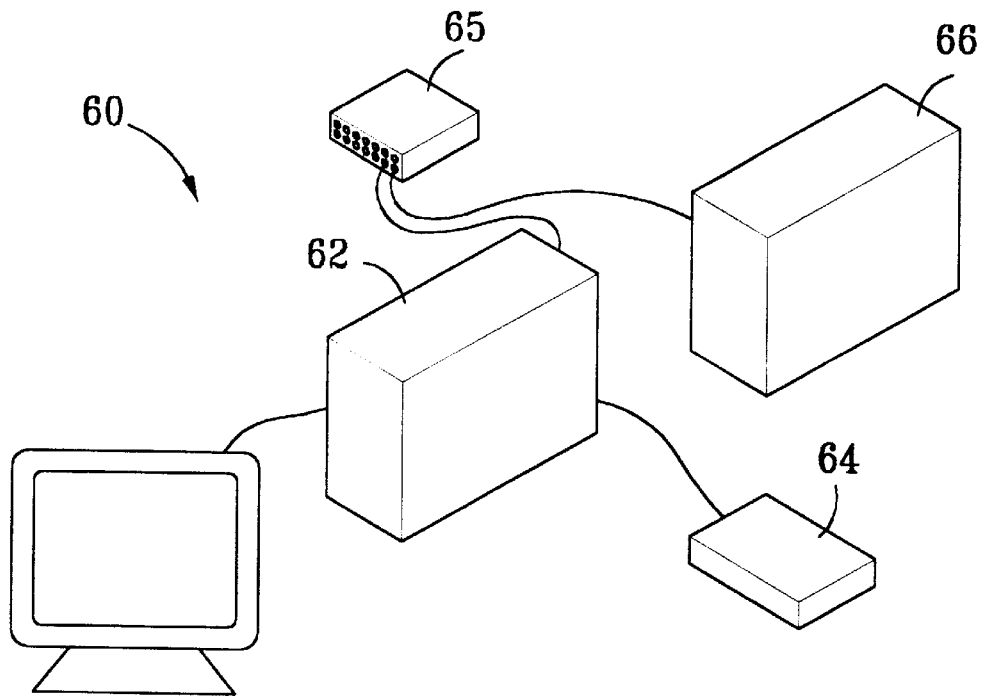
FIG. 7 is a perspective view of another peripheral control system according to the present invention.
Figure 8:
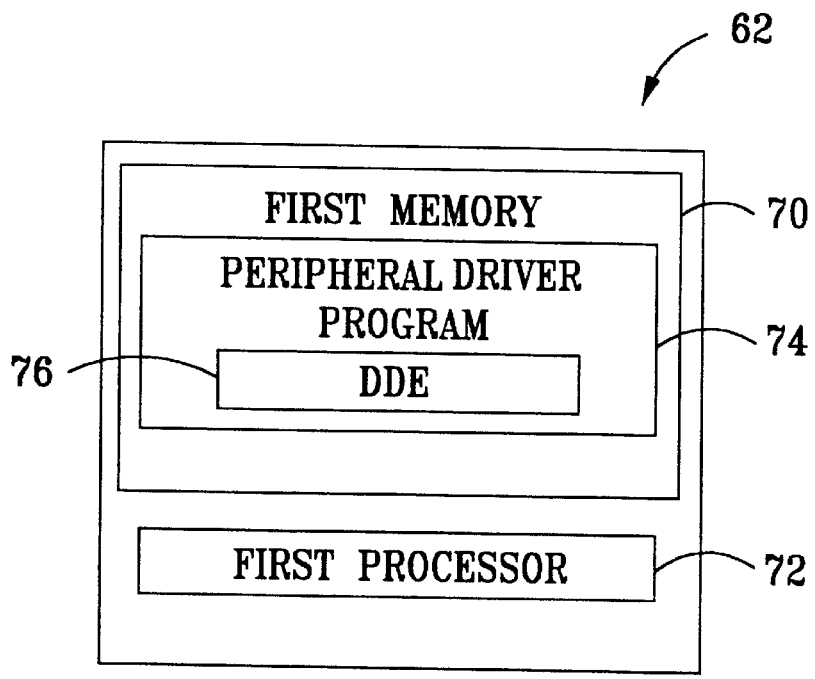
FIG. 8 is a function block diagram of the first computer shown in FIG. 7.
Figure 9:
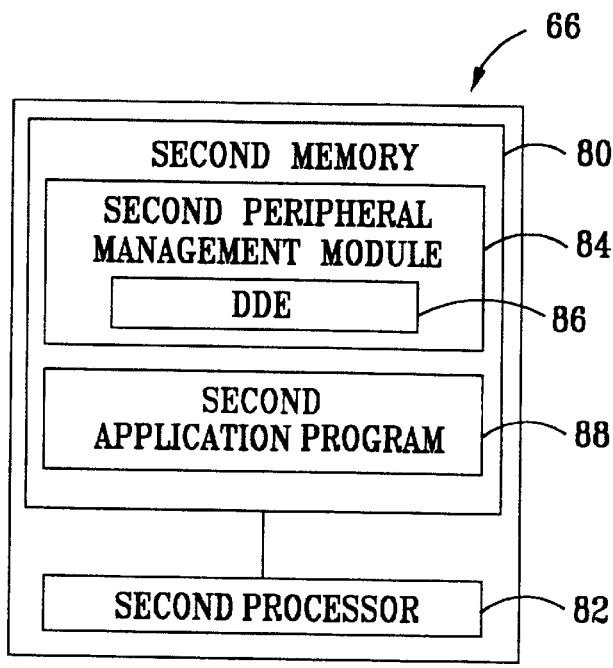
FIG. 9 is a function block diagram of the second computer shown in FIG. 7.

Please refer to FIGS. 7 to 9. FIG. 7 is a perspective view of another peripheral control system 60 according to the present invention. FIG. 8 is a function block diagram of the first computer 62 shown in FIG. 7. FIG. 9 is a function block diagram of the second computer 66 shown in FIG. 7. The peripheral control system 60 is used for controlling a peripheral device 64. It comprises a first computer 62 connected to the peripheral device 64, and a second computer 66 connected to the first computer 62 through a network 65. The first computer 62 comprises a first memory 70 for storing programs and data, and a first processor 72 for executing programs stored in the first memory 70. The first memory 70 comprises a peripheral driver program 74 stored in an executable file format for driving the peripheral de vice 64. The peripheral driver program 74 comprises a DDE module 76. The second computer 66 comprises a second memory 80 for storing programs and data, and a second processor 82 for executing programs stored in the second memory 80. The second memory 80 comprises a second peripheral management module 84 an d a second application program 88 stored in it. The second peripheral management module 84 is in an executable file format for managing the peripheral driver program 83 stored in the second memory 80, or the peripheral driver program 74 of the first computer 62. The second peripheral management module 84 comprises a second DDE module 86 for communicating with the DDE module 76 of the peripheral driver program 74 of the first computer 62 in standard network DDE protocol. The second application program 88 is in an executable file format stored in the second memory 89, and uses subroutine calls to communicate with the second peripheral management module 84. The second application program 88 communicates with the peripheral driver program 74 of the first computer 62 through the second DDE module 86 of the second peripheral management module 84.

Figure 10:
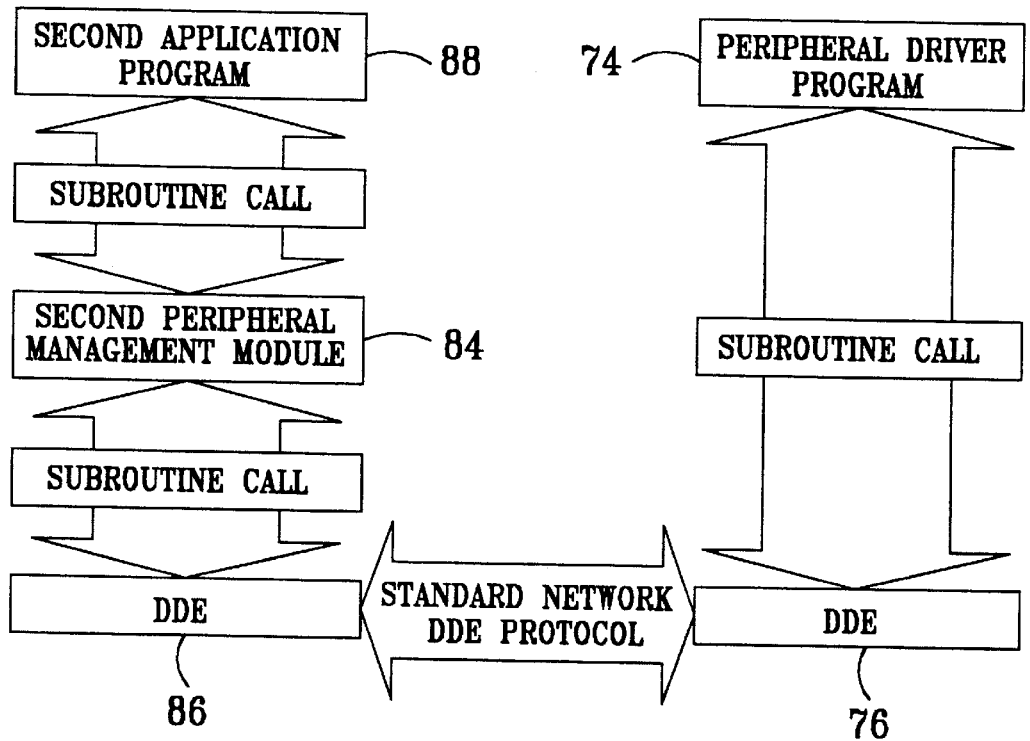
FIG. 10 is a diagrammatic view of the control flow between the second application program shown in FIG. 9 and the peripheral driver program shown in FIG. 8.

Please refer to FIG. 10. FIG. 10 is a diagrammatic view of the control flow between the second application program 88 shown in FIG. 9 and the peripheral driver program 74 shown in FIG. 8. The second application program 88 uses subroutine calls to communicate with the second peripheral management module 84, and then the second peripheral management module 84 uses subroutine calls to communicate with the second DDE module 86. The second DDE module 86 communicates with the DDE module 76 of the peripheral driver program 74 in a standard network protocol so that the peripheral driver program 74 can control the peripheral device 64 according to instructions from the second application program 88 and pass data between the peripheral device 64 and the second application program 88.

The peripheral control system 30 and 60 of the present invention have the following advantages.

1. Since the peripheral driver program is an executable file program, it comprises its own memory space and system allocated resources. The application program and the peripheral driver program are executed independently. If any one of them gets failed, it will not affect the other program.
2. The application program and the peripheral driver program can reside in different computers and communicate with each other through standard network DDE protocol. The peripheral device controlled by the peripheral driver program can thus be shared by many other application programs in the network.
3. The peripheral driver program can be executed alone so that many automatically executable functions can thus be included without using extra software or hardware for implementing such functions.
4. For users of the peripheral control system 30 or 60, the only new program needed to be installed is the peripheral driver program. The application programs and the peripheral management module of an existing system do not need to be changed even if a user attaches the peripheral device to any other computer linked in the same network.
5. For peripheral vendors, the only new program needed to be implemented is also the peripheral driver program.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A peripheral control system for controlling at least one peripheral device comprising:

a first computer electrically connected to the peripheral device comprising a memory for storing programs and data, and a processor for executing the programs stored in the memory;

at least one peripheral driver program stored in the memory in an executable file format for driving the peripheral device, the peripheral driver program comprising a DDE (Dynamic Data Exchange) module;

a peripheral management module (TWAIN) stored in the memory in a subroutine file format for managing the peripheral driver program, the peripheral management module comprising another DDE module for communicating with the DDE module of the peripheral driver program in standard DDE protocol; and at least an application program stored in the memory in an executable file format;

wherein the application program uses subroutine calls to communicate with the peripheral management module, and the peripheral management module uses its DDE module to communicate with the DDE module of the peripheral driver program whereby the peripheral driver program controls the peripheral device according to instructions generated by the application program and passes data between the peripheral device and the application program.

2. The peripheral control system of claim 1 further comprising a second computer electrically connected to the first computer through a network, the second computer comprising:

a second memory for storing programs and data;

a second processor for executing the programs stored in the second memory;

a second peripheral management module stored in the second memory in a subroutine file format for managing the peripheral driver program of the first computer, the second peripheral management module comprising a second DDE module for communicating with the DDE module of the peripheral driver program of the first computer in standard network DDE protocol; and at least one second application program stored in the second memory in an executable file format;

wherein the second application program uses subroutine calls to communicate with the second peripheral management module, and the second peripheral management module uses its DDE module to communicate with the DDE module of the peripheral driver program of the first computer whereby the peripheral driver program of the first computer controls the peripheral device according to instructions generated by the second application program and passes data between the peripheral device and the second application program.

3. A peripheral control system for controlling at least one peripheral device comprising:

a first computer electrically connected to the peripheral device having a first memory for storing programs and data, and a first processor for executing the programs stored in the first memory;

at least a first peripheral driver program stored in the first memory in an executable file format for driving the peripheral device, the first peripheral driver program comprising a first DDE module;

a second computer electrically connected to the first computer through a network, the second computer comprising a second memory for storing programs and data and a second processor for executing the programs stored in the second memory;

a second peripheral management module (TWAIN) stored in the second memory in a subroutine file format for managing the first peripheral driver program of the first computer, the second peripheral management module comprising a second DDE module for communicating with the first DDE module of the first peripheral driver program of the first computer in standard network DDE protocol; and at least a second application program stored in the second memory in an executable file format;

wherein the application program uses subroutine calls to communicate with the second peripheral management module, and the second peripheral management module uses its DDE module to communicate with the DDE module of the peripheral driver program of the first computer whereby the first peripheral driver program controls the peripheral device according to instructions generated by the application program of the second computer and passes data between the peripheral device and the application program.

* * * * *